US008876360B2

(12) United States Patent
Bierdel et al.

(10) Patent No.: US 8,876,360 B2
(45) Date of Patent: Nov. 4, 2014

(54) METHOD FOR CONSTRUCTING CO-ROTATING, CONTIGUOUS BODIES AND COMPUTER PROGRAM PRODUCT FOR CARRYING OUT SAID METHOD

(75) Inventors: Michael Bierdel, Leverkusen (DE); Thomas König, Leverkusen (DE); Ulrich Liesenfelder, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 989 days.

(21) Appl. No.: 12/995,079

(22) PCT Filed: Jun. 12, 2009

(86) PCT No.: PCT/EP2009/004249
§ 371 (c)(1),
(2), (4) Date: Nov. 29, 2010

(87) PCT Pub. No.: WO2009/153001
PCT Pub. Date: Dec. 23, 2009

(65) Prior Publication Data
US 2011/0075511 A1    Mar. 31, 2011

(30) Foreign Application Priority Data
Jun. 20, 2008   (DE) .................. 10 2008 029 304

(51) Int. Cl.
B29B 7/48   (2006.01)
B29C 47/40  (2006.01)
B29C 47/08  (2006.01)
B29C 47/62  (2006.01)
B29C 47/60  (2006.01)
B29C 47/00  (2006.01)
B29C 47/38  (2006.01)

(52) U.S. Cl.
CPC ............. *B29C 47/40* (2013.01); *B29C 47/0854* (2013.01); *B29C 47/0861* (2013.01);
(Continued)

(58) Field of Classification Search
CPC ............ B29C 47/6043; B29C 47/6062; B29C 47/6056
USPC ............... 366/82, 85, 301; 425/204, 208, 209
See application file for complete search history.

(56) References Cited

U.S. PATENT DOCUMENTS 3,195,868 A   7/1965   Loomans
3,900,187 A   8/1975   Loomans
(Continued)

FOREIGN PATENT DOCUMENTS

EP   1 093 905 A2   4/2001
WO   02 09919 A2    2/2002
WO   2004 009326 A1 1/2004

OTHER PUBLICATIONS

Klemens Kohlgruber, et al., Co-Rotating Twin-Screw Extruders: Fundamentals, Technology, and Applications, Hanser Gardner Publications, Chapter 5.2, 92-94 (2007).
Klemens Kohlgruber, et al., Co-Rotating Twin-Screw Extruders: Fundamentals, Technology, and Applications, Hanser Gardner Publications, Chapter 5.8, pp. 103-104 (2007).
(Continued)

*Primary Examiner* — Charles Cooley
*Assistant Examiner* — Marc C Howell
(74) *Attorney, Agent, or Firm* — Norris McLaughlin & Marcus, P.A.

(57) ABSTRACT

The invention relates to a method of constructing elements which wipe each other during corotation about two parallel axes in such a manner that they constantly touch each other at at least one point.

13 Claims, 8 Drawing Sheets

(52) U.S. Cl.
CPC ........... *B29C 47/402* (2013.01); *B29C 47/0881* (2013.01); *B29B 7/483* (2013.01); *B29C 47/0844* (2013.01); *B29C 47/627* (2013.01); *B29C 47/6056* (2013.01); *B29C 47/0009* (2013.01); *B29C 47/0825* (2013.01); *B29C 47/38* (2013.01); *B29C 47/60* (2013.01)
USPC ......................................................... 366/82

(56) References Cited

U.S. PATENT DOCUMENTS

| | | | |
|---|---|---|---|
| 4,063,717 A | 12/1977 | Booy | |
| 5,573,332 A * | 11/1996 | Weihrich et al. | 366/85 |
| 6,447,156 B2 * | 9/2002 | Maris | 366/82 |
| 7,270,471 B2 | 9/2007 | Blach | |
| 2005/0041521 A1 * | 2/2005 | Herter | 366/82 |
| 2005/0063246 A1 * | 3/2005 | Ponzielli | 366/85 |
| 2005/0084559 A1 * | 4/2005 | Blach | 425/208 |

OTHER PUBLICATIONS

Klemens Kohlgruber, et al., Co-Rotating Twin-Screw Extruders: Fundamentals, Technology, and Applications, Hanser Gardner Publications, Chapter 12, 215-235 (2007).

Boony "Geometry of fully wiped twin-screw equipment", Polymer Engineering and Science 18 (1978) 12, S. 973-984.

Klemens Kohlgruber; Co-Rotating Twin-Screw Extruders; Fundamentals, Technology, and Applications; Cael Hanser Publishers; Munich; 2007.

\* cited by examiner

1) R = 0.5800  Mx = 0.0000
   α = 1.0393  My = 0.0000
2) R = 0.0000  Mx = 0.2939
   α = 0.5315  My = 0.5000
2') R = 1.0000  Mx = 0.2939
   α = 0.5315  My = -0.5000
1') R = 0.4200  Mx = 0.0000
   α = 1.0393  My = 0.0000

1) R = 0.6300  Mx = 0.0000
   α = 0.9168  My = 0.0000
2) R = 0.0000  Mx = 0.3833
   α = 0.6540  My = 0.5000
2') R = 1.0000  Mx = 0.3833
   α = 0.6540  My = -0.5000
1') R = 0.3700  Mx = 0.0000
   α = 0.9168  My = 0.0000

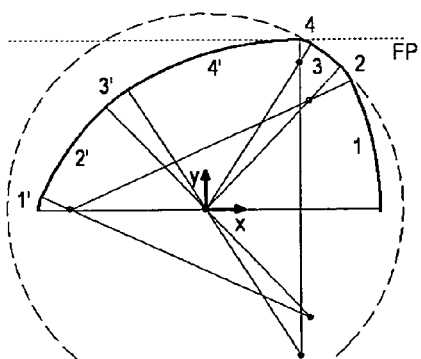

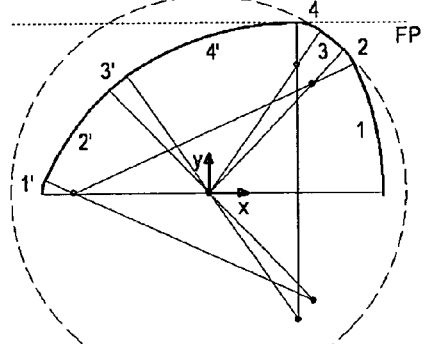

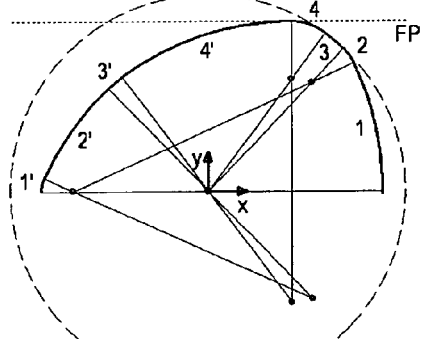

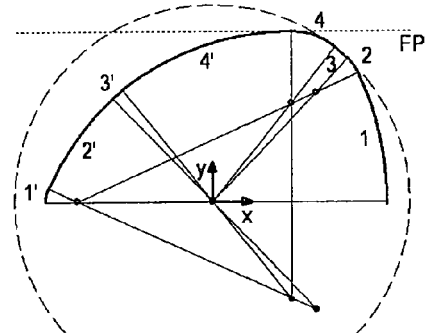

METHOD FOR CONSTRUCTING CO-ROTATING, CONTIGUOUS BODIES AND COMPUTER PROGRAM PRODUCT FOR CARRYING OUT SAID METHOD

This is an application filed under 35 U.S.C. §371 of PCT/EP2009/004249, claiming priority to DE 10 2008 029 304.0 filed on Jun. 20, 2008.

BACKGROUND OF THE INVENTION (1) Field of the Invention

The present invention relates to a method of constructing elements which wipe each other during corotation about two parallel axes in such a manner that they constantly touch each other at at least one point.

(2) Description of Related Art

In the case of two circles which are arranged adjacent to each other on two parallel axes, as depicted diagrammatically in FIG. 1, it is generally known that such circles wipe each other during corotation in such a manner that they constantly touch each other at a point located between the centres of rotation of the circles.

It is also known that not only circles but also a number of additional geometrical configurations exist which constantly touch each other at one point during their corotation. One example of such configurations is shown in FIG. 2.

The two-dimensional geometrical configurations shown in FIGS. 1 and 2 can be extended in the third dimension in different ways. One simple alternative is, for example, to extend the configurations linearly in the direction of the axes of rotation to form disc-like elements which wipe each other during corotation along a line between the centres of rotation which runs parallel to the axes of rotation.

Another alternative is, for example, to extend the geometrical configurations in a screw-like fashion along the axes of rotation, so that screw-like elements are formed which touch each other along a curve between the elements.

Such elements which constantly touch each other at at least one point during their corotation about parallel axes are of particular importance in extruder technology where they are used as screw extruders, for example, for processing viscous materials or for mixing purposes. Such corotating twin- and multi-screw extruders are known to those skilled in the art from patent and technical literature. The following publication [1] can be mentioned as an example in this connection: K. Kohlgrüber: "*Der gleichläufige Doppelschneckenextruder*" ("*Corotating twin-screw extruders*"), Publishers: Hanser Verlag, 2007. In screw extruders, the property that adjacent screws wipe each other in pairs during corotation has the advantage that they reciprocally scrape and therefore clean each other.

Rules exist for the construction of selected elements which constantly touch each other at at least one point during their corotation about parallel axes.

Thus, it is for example known from the literature on screw extruders (see for example pages 96 to 98 of [1]) that a screw element with a cross-sectional profile of the geometrical configuration of FIG. 2 of the present application can be constructed from arcs.

The general criteria which have to be fulfilled in order to ensure that two elements corotating about two parallel axes constantly touch each other at at least one point have however not so far been disclosed.

It is known (see for example [2]: Booy "*Geometry of fully wiped twin-screw equipment*", Polymer Engineering and Science 18 (1978) 12, pages 973-984) that the corotation of two intercontacting elements about their stationary axes is kinematically equivalent to the "movement without rotation" of the one element about the other—in this case stationary—element. This special phenomenon can be used for the stepwise generation of geometrical configurations which constantly touch each other at one point during their corotation. During this process the first ("generated") configuration remains stationary and the second ("generating") configuration is translationally moved about the first configuration on an arc. It is possible to predefine part of the profile of the second configuration and determine which profile is thereby generated on the first configuration. The generated configuration is, as it were, "carved" out by the generating configuration.

No general method as to how to generate the actual predefined part of the second configuration has, however, so far been disclosed. Although [2] describes one possible approach for generating the starting profile section from which the remaining profile is generated, this approach is mathematically highly laborious and above all not universally applicable, i.e. it is only possible to generate such profiles capable of being defined by the mathematical functions specified in [2].

Based on the prior art, the problem therefore arose of providing a general method of constructing elements which constantly touch each other at at least one point during their corotation.

Surprisingly, the basic principles underlying such elements which constantly touch each other at at least one point as they corotate about parallel axes have now been found. These basic principles make it possible to formulate a simple method of constructing such elements. Surprisingly it has been found that such elements can be constructed simply on paper using a pair of compasses and an angle ruler, without the need for complicated calculations.

BRIEF SUMMARY OF THE INVENTION

The present invention therefore relates to a method of constructing elements which constantly touch each other at at least one point during their corotation, which is characterized by the features of claim 1.

The basic principles underlying the method according to the invention relate to the profiles of two elements K1 and K2. The profile of an element is understood to be either the profile of a cross-section vertical to the axis of rotation of the element or the profile of a projection of the element on to a plane vertical to the axis of rotation of the element.

The basic principles are as follows:

1. Surprisingly it has been found that the profiles of two elements K1 and K2, which are arranged on parallel axes at a centre distance from each other of a and which constantly touch each other at at least one point as they corotate about these axes, can always be constructed from arcs. The size of an arc is defined by its central angle and its radius. In the following, the "central angle of an arc" is abbreviated to the "angle of an arc". The position of an arc is defined by the position of its centre point and that of its starting or end point. The position of the starting point and the end point of an arc is, however, not predefined, since an arc can be constructed starting from the starting point and ending at the end point either in a clockwise or an anti-clockwise direction. The starting and end points are therefore interchangeable.

2. Surprisingly it has been found that the arcs of the profiles of elements K1 and K2 merge tangentially into each other at their starting and end points.

3. Surprisingly it has been found that the basic principle 2 also applies to profiles with a kink if the kink is defined by an arc with a radius of 0.

The "size of the kink" is defined by the corresponding angle of the arc with a radius of 0, i.e. at a kink a transition takes place from a first arc to a third arc by rotation through the angle of a second arc with a radius of zero. Or, in other words: A tangent on the first arc at the centre point of the second arc with a radius of zero intersects a tangent on the third arc also at the centre point of the second arc at an angle corresponding to the angle of the second arc. With the inclusion of the second arc all of the adjacent, i.e. first→second→third, arcs merge tangentially into each other. Appropriately an arc with a radius of 0 is treated in the same way as an arc with a radius of eps, which is a very small positive real number which tends towards 0 (eps<<1, eps→0).

4. Surprisingly it has been found that each arc of element K1 "corresponds" to an arc of element K2. "Correspond" is understood to mean that
   the angles of corresponding arcs are identical in size,
   the sum of the radii of corresponding arcs equals the centre distance a,
   the connecting lines between the centre point of an arc of element K1 and its end points are parallel to the connecting lines between the centre point of the corresponding arc of element K2 and its end points,
   those directions in which the end points of an arc of element K1 lie starting from the centre point of said arc are in each case opposite those directions in which the end points of the corresponding arc of element K2 lie starting from the centre point of the arc of element K2,
   the distance between the centre point of an arc of element K1 and the centre point of the corresponding arc of element K2 equals the centre distance,
   the connecting line between the centre point of an arc of element K1 and the centre point of the corresponding arc of element K2 is parallel to the connecting line between the point of rotation of element K1 and the point of rotation of element K2,
   the direction in which the centre point of an arc of element K1 would have to be shifted in order to fit exactly over the centre point of the corresponding arc of element K2 is the same as that in which the point of rotation of element K1 must be shifted in order to fit exactly over the point of rotation of element K2.

These basic principles can be used for formulating the method according to the invention for constructing elements which constantly touch each other at one point during their corotation. Such elements are hereinafter referred to as corresponding elements.

The profiles of the corresponding elements K1 and K2 lie in the same plane. The axis of rotation of element K1 and that of element K2 are each vertical on said plane, the points of intersection between the axes of rotation and said plane being referred to as the points of rotation. The distance between the points of rotation is referred to as the centre distance a. In the following $\pi$ is understood to be pi ($\pi \approx 3.14159$).

In a first step, the profile of element K1 is generated. The profile of element K1 determines the profile of element K2.
   A number of arcs n is selected for forming the profile of the element K1, wherein n is an integer which is greater than or equal to 1.
   An outer radius ra is selected, wherein ra can be greater than 0 (ra>0) and smaller than or equal to the centre distance (ra≤a).
   An inner radius ri is selected, wherein ri can be greater than or equal to 0 (ri≥0) and smaller than or equal to ra (ri≤ra).
   The n number of arcs of element K1 are arranged clockwise or anti-clockwise about the axis of rotation of element K1 according to the following configuration rules:
      the sizes of the n−1 arcs are determined by the selectable angles $\alpha\_1, \alpha\_2, \ldots, \alpha\_(n-1)$ and the selectable radii $r\_1, r\_2, \ldots, r\_(n-1)$, wherein the angles are, in terms of radian measurement, greater than or equal to 0 and smaller than or equal to $2\pi$ and the radii are greater than or equal to 0 and smaller than or equal to the centre distance a,
      the angle $\alpha\_n$ of a last arc is determined by the fact that the sum of then angles of the n arcs is, in terms of radian measurement, $2\pi$,
      the radius $r\_n$ of a last arc is determined by the fact that this last arc closes the profile,
      all of the arcs merge into each other tangentially to form a convex profile,
      an arc with a radius of 0 is treated preferably in the same way as an arc with a radius of eps, which is a very small positive real number which tends towards 0 (eps<<1, eps→0),
      all of the arcs are located within or on the boundary of an annulus which has the outer radius ra and the inner radius ri and whose centre point is located on the point of rotation of element K1,
      at least one of the arcs touches the outer radius ra,
      at least one of the arcs touches the inner radius ri.
   The number n' of arcs which form the profile of element K2, their angles $\alpha\_1', \alpha\_2', \ldots, \alpha\_n'$ and their radii $r\_1', r\_2', \ldots, r\_n'$ are as follows:
   n'=n
   $\alpha\_1'=\alpha\_1; \alpha\_2'=\alpha\_2; \ldots; \alpha\_n'=\alpha\_n$
   $r\_1'=a-r\_1; r\_2'=a-r\_2; \ldots r\_n'=a-r\_n$
   The positions of the n' arcs which form the profile of element K2 are as follows:
      the distance between the centre point of the i'nth arc of the profile of element K2 and the centre point of the inth arc of the profile of element K1 is equal to the centre distance a,
      the distance between the centre point of the i'nth arc of the profile of element K2 and the point of rotation of element K2 corresponds to the distance between the centre point of the inth arc of the profile of element K1 and the point of rotation of element K1,
      the connecting line between the centre point of the i'nth arc of the profile of element K2 and the centre point of the inth arc of the profile of element K1 is a line parallel to a connecting line between the point of rotation of element K2 and the point of rotation of element K1,
      a starting point of the i'nth arc of the profile of element K2 lies in an opposite direction, in relation to the centre point of the i'nth arc of the profile of element K2, to that of a starting point of the inth arc of the profile of element K1 in relation to the centre point of the inth arc of the profile of element K1, wherein i and i' are integers which together represent all values in the range from 1 to the number of arcs n and n' respectively (i'=i).

Surprisingly the method according to the invention can be carried out on paper merely by using an angle ruler and a pair of compasses. Thus the tangential transition between the inth and the (i+1)nth arc of the profile of an element is, for example, constructed by forming a circle with the radius $r\_(i+1)$ around the end point of the inth arc, and that point of intersection between this circle and a straight line through the centre point and the end point of the inth arc which is located nearer the point of rotation of the element is the centre point of the (i+1)nth arc. In practice, instead of using a sketch pad, an angle ruler and a pair of compasses, the profiles will normally be generated virtually with the aid of a computer.

In practice, the profiles of elements K1 and K2 are appropriately placed in a coordinate system in order to be able to define them distinctly and in an appropriate form for further use by specifying the coordinates of characteristic parameters. It is recommendable to use dimensionless parameters. The centre distance a is a useful reference value for geometrical dimensions such as for example lengths or radii. The dimensionless centre distance A is a/a=1. The dimensionless outer radius RA of a profile is ra/a. The dimensionless inner radius RI of a profile is ri/a.

It is appropriate to position the point of rotation of a profile, such as for example that of the profile of element K1, at the origin of a Cartesian coordinate system (x=0, y=0) and then to position the point of rotation of the corresponding profile of element K2 at point x=A=1, y=0.

Using a Cartesian coordinate system with the point of rotation of the profile of element K1 at the origin (x=0, y=0) and the point of rotation of element K2 at the point having the coordinates x=A=1, y=0 and using dimensionless parameters, the following preferred embodiment of the method according to the invention is obtained:

A number of arcs n is selected for forming the profile of element K1, wherein n is an integer which is greater than or equal to 1.

An outer radius RA is selected which is greater than 0 (RA>0) and smaller than or equal to the centre distance (RA≤1).

An inner radius RI is selected which is greater than or equal to 0 (RI≥0) and smaller than or equal to RA (RI≤RA).

The 1, 2, . . . , (i−1), i, (i+1), . . . , (n−1), n arcs of element K1 are arranged clockwise or anticlockwise around the axis of rotation of element K1 according to the following configuration rules, wherein i is an index which represents the numbers from 1 to n:

the sum of the angles $\alpha\_i$ of all of the arcs is $2\pi$, the radius $R\_i$ of each individual arc is greater than or equal to 0 and smaller than or equal to 1, the starting and centre points of a first arc are placed on the x axis, the starting point being placed in the region between x=RI and x=RA and the x coordinate of the centre point being smaller than or equal to the x coordinate of the starting point, where i<n, the end point of the inth arc is at the same time the starting point of the (i+1)nth arc, where i=n, the end point of the inth arc is at the same time the starting point of the first arc, each arc merges tangentially into the next arc, wherein an arc with $R\_i=0$ is preferably treated in the same way as an arc with $R\_i=eps$, wherein eps is a very small positive real number which tends towards 0 (eps<<1, eps→0), at no point of the profile is the distance from the point of rotation greater than the outer radius RA, at at least one point of the profile the distance from the point of rotation is equal to the outer radius RA, at no point of the profile is the distance from the point of rotation smaller than the inner radius RI, at at least one point of the profile the distance from the point of rotation is equal to the inner radius RI, the profile is convex.

The profile of element K2 is based on the profile of element K1, as follows:

n'=n i' is an index which represents all numbers from 1 to n'

$\alpha\_i'=\alpha\_i$ where i=i'

$R\_i'+R\_i=1$ where i=i' the profile consists of n' arcs which are arranged in the same clock direction as the arcs of the profile of element K1, the starting point of the first arc of the profile of element K2 is at the same time the starting point of the first arc of the profile of element K1 and the centre point of the first arc of the profile of element K2 is located on the x axis, the x coordinate of the centre point being greater than or equal to the x coordinate of the starting point, where i'<n' the end point of the i'nth arc is at the same time the starting point of the (i+1)'nth arc, where i'=n' the end point of the i'nth arc is at the same time the starting point of the 1'nth arc, each of the arcs merges tangentially into the next arc, an arc with $R\_i'=0$ preferably being treated in the same way as an arc with $R\_i'=eps$, wherein eps is a very small positive real number which tends towards 0 (eps<<1, eps→0), the profile is convex.

Using the method according to the invention different profiles can be generated for the corresponding elements K1 and K2.

It is also possible for profiles to be generated for the corresponding elements K1 and K2 which are identical or can be converted into one another by rotation and/or mirroring. Such profiles which are identical or which can be converted into one another by symmetry-based operations are characterized in that they each have a z number of planes of symmetry which are vertical on the plane of the profiles and pass through the respective axis of rotation of the profile.

Each such profile can be subdivided into 2*z sections, each of which is at an section angle of $\pi/z$ to the respective point of rotation of the profile. These sections fit over each other exactly on being rotated and/or mirrored at the planes of symmetry. The number z is also referred to as the flight number in this context and hereinbelow and it is a natural whole number (z=1, 2, 3, . . . ).

The profile of element K2 is based on the profile of element K1: Where the flight number is an odd number, profiles K1 and K2 are identical; where the flight number is an even number the profile of element K2 is obtained by rotating the profile of element K1 through an angle $\pi/z$.

The profile of element K1 can be generated as follows:

a flight number z is selected, wherein z is an integer which is greater than or equal to 1, the number of arcs n is selected such that n is an integer multiple p of 4*z, the profile is subdivided into 2*z sections which are characterized in that each section is bounded by two straight lines which form an angle to each other, in terms of radian measurement, of $\pi/z$ and which intersect each other at the point of rotation of the profile, wherein these two straight lines are referred to as section boundaries, each of these 2*z sections is subdivided into a first and a second part, the first part of a section is composed of p arcs which are numbered in ascending or descending order, angles $\alpha\_1, \ldots, \alpha\_p$ of the p arcs are selected so as to give a sum of these angles of $\pi/(2*z)$, wherein the angles are, in terms of radian measurement, greater than or equal to 0 and smaller than or equal to $\pi/(2*z)$, the second part of a section is composed of p' arcs which are numbered in reverse order like the arcs of the first part of a section, wherein p' is an integer which is the same as p, angles $\alpha\_p', \ldots, \alpha\_1'$ of the p' arcs are formed in such a manner that angle $\alpha\_j'$ of the j'th arc of the second part of a section is the same as angle $\alpha\_j$ of the jth arc of the first part of a section, wherein j and j' are integers which together represent all values in the range from 1 to the number of arcs p and p' respectively ($\alpha\_1'=\alpha\_1, \ldots, \alpha\_p'=\alpha\_p$), the sum of the radius $r\_j'$ of the j'th arc of the second part of a section and the radius $r\_j$ of the jth arc of the first part of a section is equal to the centre distance a, wherein j and j' are integers which together represent all values in the range from 1 to the number of arcs p and p' respectively ($r\_1'+r\_1=a, \ldots, r\_p'+r\_p=a$), a centre point and a starting point of the arc with which the profile begins in the first part of a section are positioned on one of the section boundaries of this section, depending on whether the arcs are arranged in a clockwise or an anticlockwise direction, an end point of the arc with which the profile ends in the first part of a section touches a straight line FP at one point, the straight line FP being vertical on the angle bisector of the two section boundaries of this section and at a distance from the point of rotation of the profile in the direction of this section which is equal to half the centre distance, the angle bisector passing, in the same way as the section boundaries, through the point of rotation.

Profiles generated by the above method consist of 2*z sections which can be different from each other. If these sections are different from each other asymmetric profiles are obtained.

In the case of axially symmetrical profiles all of the 2*z sections fit exactly over each other on being mirrored at the section boundaries. The section boundaries are then located on the lines of intersection between the planes of symmetry of the respective profile and the plane in which the profile lies. This has the advantage that only a first section of the profile needs to be generated in the abovementioned manner. The additional sections are obtained by continuously mirroring the first section at the section boundaries.

It is also possible to generate profiles which are dot-symmetrical at the point of rotation. In this case one section is predefined, whereas the section on the opposite side of the profile is obtained by dot mirroring the predefined section at the point of rotation. In this manner dot-symmetrical profiles can be generated section by section, although the abovementioned configuration rules must be followed in order to obtain a closed, convex profile.

Screw elements for twin- or multishaft extruders are usually incorporated in a barrel. In this case the screw elements and the barrel are designed in such a manner that, as the screw elements rotate, not only do pairs of adjacent screw elements abrade each other but the inner barrel walls are also wiped clean by the rotation of the screw elements.

As explained for example on pages 27 to 30 of publication [1], arrangements of screw elements and a barrel almost always have so-called clearances, which, as is known to those skilled in the art, are different or identical between the screws and the barrel and between pairs of screws. The clearance between the screws and the barrel is referred to as δ and the clearance between pairs of screws is referred to as s. These clearances can also be constant or vary within specified limits. It is also possible to shift a screw profile within the clearances. Those skilled in the art are also aware of methods of obtaining a screw profile with clearances based on a given fully abrading screw profile. Known methods of doing so are for example those described on pages 28 et seq. of [1] of increasing the centre distance, of longitudinal equidistant clearance and of three-dimensional equidistant clearance. In the case of increasing the centre distance a screw profile with a smaller diameter is constructed and pulled away by the size of the clearance between the screws. In the case of the method of longitudinal equidistant clearance the profile contour of the longitudinal section (parallel to the axis of rotation of the element concerned) is shifted inwards towards the axis of rotation vertically to the profile contour by half the clearance between the screws. In the case of the method of three-dimensional equidistant clearance, which is based on the three-dimensional curved contour along which the screw elements wipe each other, the screw element is reduced in size in a vertical direction to the surfaces of the fully abrading profile by half of the clearance between the screws.

The eccentric positioning of screw elements in a barrel while retaining the abrading of the barrel and that between pairs of screw elements is also known to the those skilled in the art of extruder technology (see, for example, pages 108, 246 and 249 of [1]).

The use of barrels, clearances and/or eccentric positioning can be accordingly applied to corresponding elements which, during rotation in the same direction about two parallel axes, wipe each other in such a manner that they always touch each other at at least one point.

As is readily understandable to those skilled in the art from the information, the method according to the invention is suitable for generating transitional profiles between profiles having different numbers of flights. Starting from a profile with a flight number z it is possible to obtain profiles with a flight number z' which is different from z by changing the profiles of the corresponding elements gradually. In doing so it is permissible to reduce or increase the number of arcs during the transition.

It is also possible to generate transitional profiles between profiles having identical numbers of flights. Starting from a z-flight profile it is possible to generate a different z-flight profile by changing the profile gradually during the transition. In doing so it is permissible to reduce or increase the number of arcs during the transition.

The profiles of corresponding elements can be extended into the third dimension in various ways for generating the elements. This can be explained using the example of screw elements for screw extruders. Screw elements have the above-mentioned cross-sectional profiles which always touch each other at one point during their corotation about two parallel adjacent axes. Screw elements can be designed, for example, in the form of conveying, kneading or mixing elements.

A conveying element is characterized by a screw profile which continuously rotates and extends in an axial direction in the shape of a screw (see, for example, pages 227-248 of [1]). The conveying element can be in a right- or left-hand direction. The pitch of the conveying element, i.e. the axial length required for the complete rotation of the screw profile, is preferably in the range from 0.1 to 10 times the centre distance and the axial length of a conveying element is preferably in the range from 0.1 to 10 times the centre distance.

A kneading element is characterized by a screw profile which extends stepwise in an axial direction in the form of kneading discs (see, for example pages 227-248 of [1]). These kneading discs can be arranged in a right-handed, left-handed or neutral fashion. The axial length of the kneading discs is preferably in the range from 0.05 to 10 times the centre distance. The axial distance between two adjacent kneading discs is preferably in the range from 0.002 to 0.1 times the centre distance.

Mixing elements are formed by designing conveying elements with openings in the screw tips (see, for example, pages 227-248 of [1]). The mixing elements can be in a right-handed or left-hand direction. Their pitch is preferably in the range from 0.1 to 10 times the centre distance and the axial length of the elements is preferably in the range from 0.1 to 10 times the centre distance. The openings are preferably designed in the form of a u- or v-shaped groove and they are preferably arranged either in a backward-conveying manner or parallel to the axis.

In order to obtain a transition between different screw elements, washers are frequently used as spacers. In special cases, so-called transition elements are used which provide a continuous transition between two screw profiles with different numbers of flights, a self-cleaning pair of screw profiles being present at each transition point. Transition elements can be in a right- or left-hand direction. Their pitch is preferably in the range from 0.1 to 10 times the centre distance and their axial length is preferably in the range from 0.1 to 10 times the centre distance.

As already mentioned, the method according to the invention can be carried out on paper merely by using an angle ruler and a pair of compasses. The execution of the method according to the invention using a computer system is advantageous since the coordinates and the dimensions of the profiles are in such a form that they can be processed further using a computer.

The present invention also relates to a computer program product with program code means for executing the method according to the invention by means of a computer. The computer program product according to the invention is characterized in that the method according to the invention is stored in the form of program codes on a data carrier. The data carrier is computer-readable to enable the method according to the invention to be carried out using a computer when the computer program product is executed using a computer. A suitable data carrier is, for example, a disc, an optical data carrier such as for example a CD, DVD, or Blu-ray disc, a hard disc, a flash memory or a memory stick, etc. Preferably the computer program product, when executed in a computer, has a graphical user interface (GUI) which provides users with a simple means of entering the freely selectable parameters for generating profiles with the aid of input devices such as, for example a mouse and/or a keyboard. In addition, the computer program product preferably has a graphical output, by means of which the computed profiles can be visualized in a graphical output device, such as for example a screen and/or a printer. Preferably the computer program product allows computed profiles to be exported, i.e. in the form of storable data sets, which include the geometrical dimensions of the computed elements. These data sets can then be stored on a data carrier or transferred to a connected device for further applications. In particular, the computer program product is designed in such a manner that, when executed in a computer, it can compute not only profiles but also elements generated from the profiles and can deliver the computed geometries in a format that can be used by a machine for producing such elements, for example by a milling machine for producing actual elements. Such formats are known to those skilled in the art.

After the profiles have been generated in the described manner the elements can be generated using, for example, a milling machine, a lathe or a whirling machine. Preferred materials for generating such elements are steels, and in particular nitrated steels, chromium, tool and stainless steels, metallic composite materials produced by powder metallurgy and based on iron, nickel or cobalt and engineering ceramic materials such as for example zirconium oxide or silicon carbide.

The present invention makes it possible to generate the profiles of corresponding elements right from the beginning. In contrast to the prior art, the method according to the invention is not based on existing profiles but allows the generation of any desired profiles by selecting the values for characteristic parameters such as for example the centre distance and the number of arcs for developing the required profiles and generating the profiles step by step by observing simple rules. The method according to the invention is simple to use and can also even be carried out using a pair of compasses and an angle ruler, without the need for complicated calculations. The method according to the invention is universally applicable, i.e. it is, for example, not restricted to a concrete number of flights, but it is even possible by varying the values concerned to generate profiles which change from one flight number to another. In addition, the invention allows the generation of symmetrical and asymmetrical profiles. It is also possible to generate profiles in which the corresponding profiles are different, i.e. do not fit exactly over each other.

BRIEF DESCRIPTION OF THE DRAWINGS

FIG. 5 a-d depict 8-circle profiles;

DETAILED DESCRIPTION OF THE INVENTION

The invention is explained in an exemplary fashion in more detail below with reference to the figures, without however being limited thereto. FIGS. 3 to 8 have been generated with the aid of a computer program.

Dimensionless parameters are used in the examples. The reference value used for lengths or radii is the centre distance. The dimensionless centre distance A is a/a=1. The dimensionless outer radius RA of a profile is ra/a. The dimensionless inner radius RI of a profile is ri/a.

In the figures all of the geometrical values are used in their dimensionless form. All of the angles are stated in terms of radian measurement.

The method according to the invention is explained in more detail with reference to FIG. 3 without, however, being limited to this figure.

FIGS. 3a to 3f show the transition from a pair of two-flight profiles to a pair of one-flight profiles. All of these figures have the same structure, which is described in detail in the following. The generating profile of element K1 is depicted by the profile on the left. The profile of the corresponding element K2 is depicted by the profile on the right. Both profiles consist of 16 arcs. The arcs are characterized by thick, unbroken lines labelled with the respective numbers of the arcs. Due to the plurality of the arcs and the generation of the figures by means of a computer program it is possible for the numbers of individual arcs to overlap each other and therefore to be difficult to read—see, for example, arcs 3', 4' and arcs 5', 6', 7' in FIG. 3*a*. Despite the in some cases poor readability of individual numbers, the structure of the profiles is nevertheless clear from the context in combination with the present description.

The centre points of the arcs are depicted by small circles. The centre points of the arcs are connected by thin unbroken lines both to the starting point and to the end point of the corresponding arc. The outer radius is identical in size both for the profile of element K1 and for that of element K2.

Figure 1:
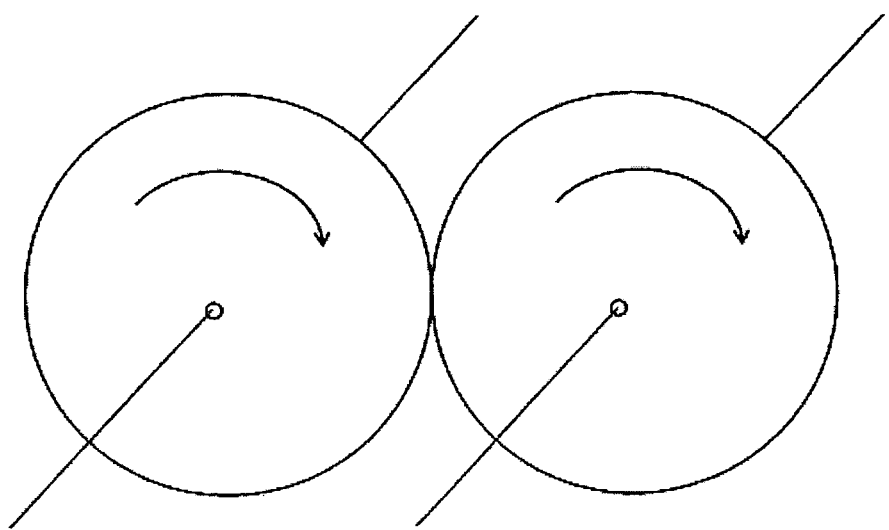
FIG. 1 shows two circles adjacent to each other and touching each other during rotation.
Figure 2:
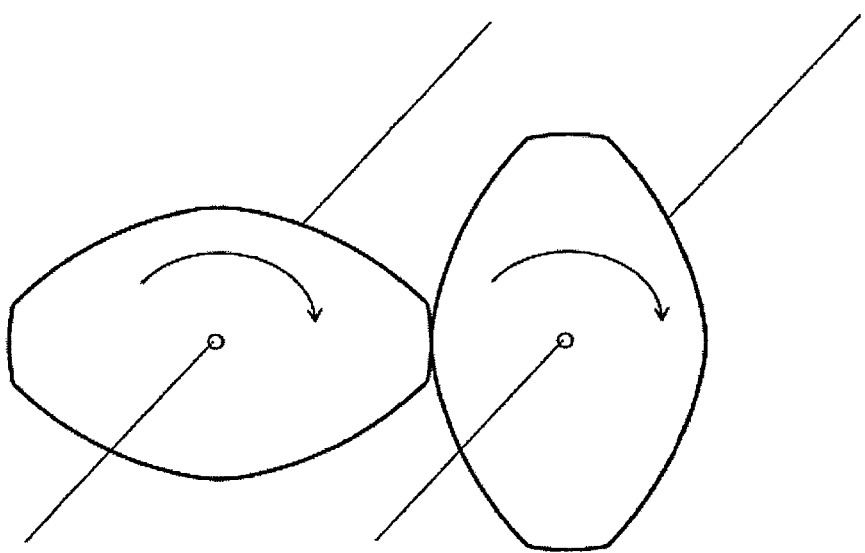
FIG. 2 shows depicts two geometrical configurations touching each other at one point during rotation.
Figure 3A:
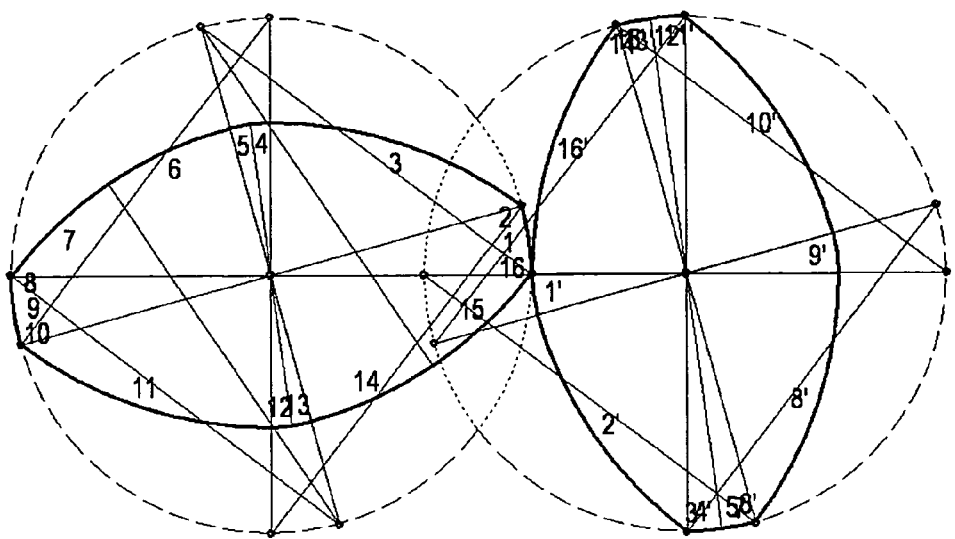
FIG. 3 a-f show the transition for a pair of two-flight profiles to a pair of one-flight profiles.

FIG. 3*a* shows a pair of two-flight profiles which is located at the beginning of the transition section. The profiles are symmetrical to each other. Arcs 1 and 9 of the profile of element K1 touch the outer radius over their entire length. Arcs 4, 5 and 12, 13 touch the inner radius over their entire length. Arcs 4', 5' and 12', 13' of the profile of element K2 touch the outer radius over their entire length. Arcs 1' and 9' touch the inner radius over their entire length.

Figure 3B:
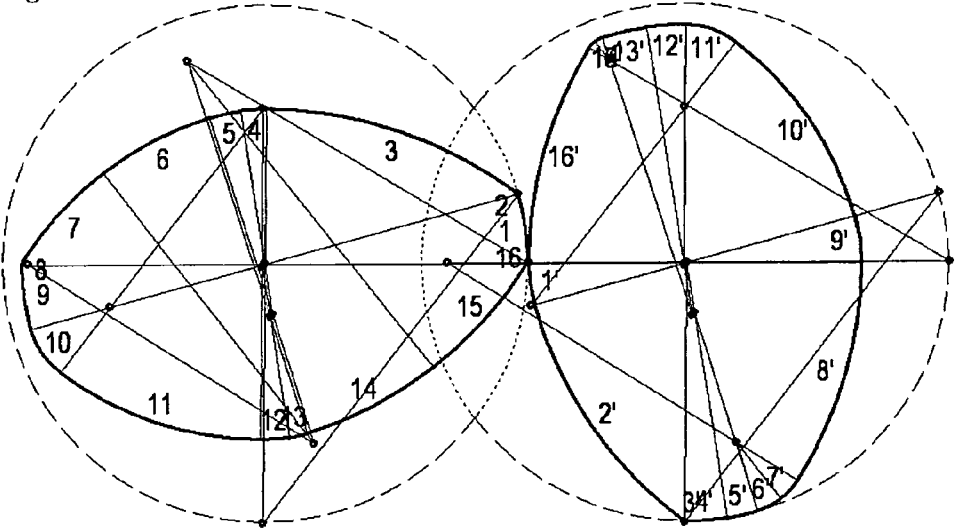
Figure 3C:
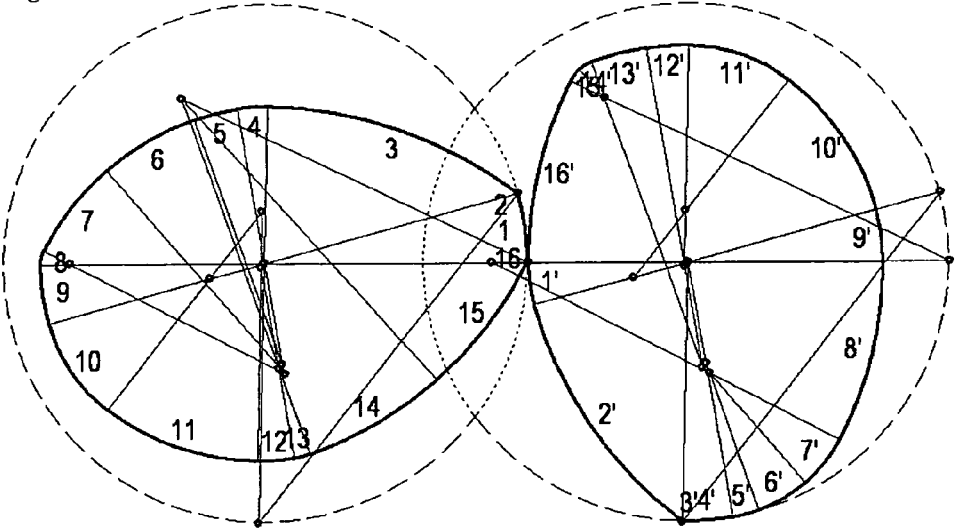
Figure 3D:
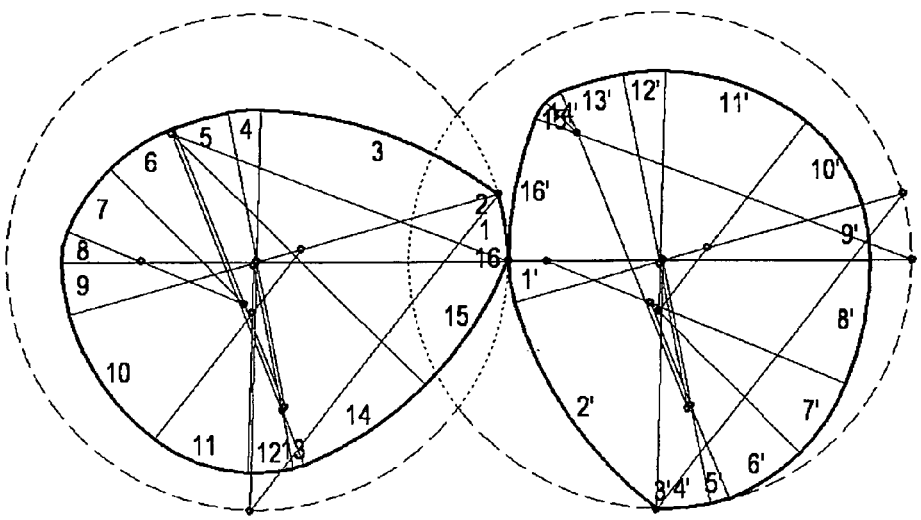
Figure 3E:
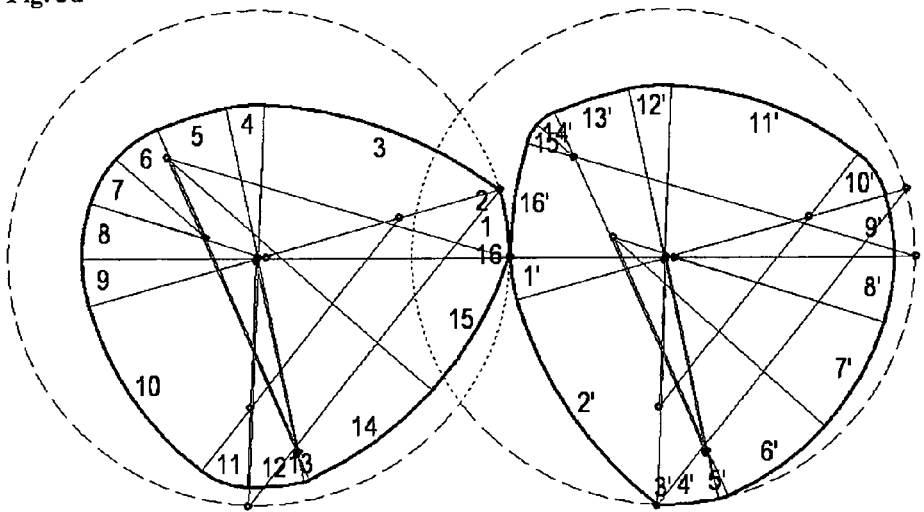
Figure 3F:
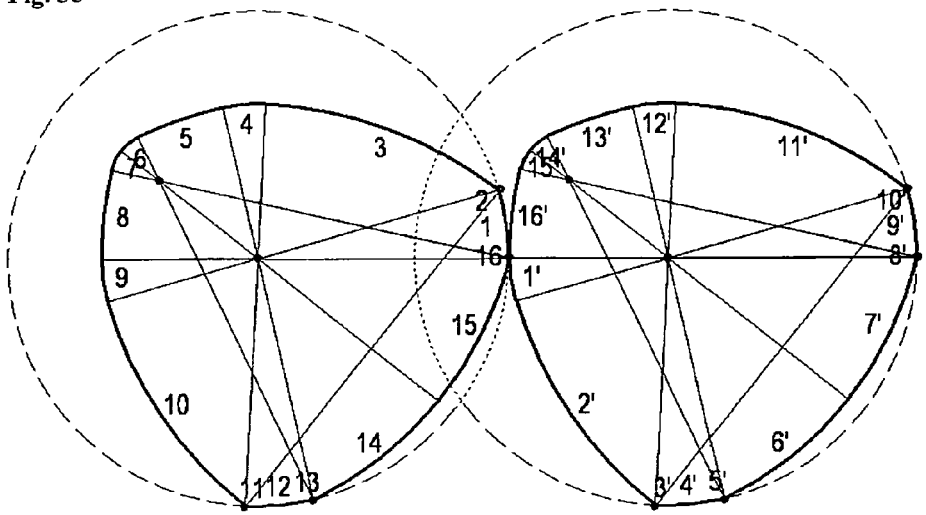

FIG. 3*f* shows a pair of one-flight profiles which is located at the end of the transition section. The profile of element K1 and the profile of element K2 are symmetrical to each other. Arcs 1 and 12 of element K1 touch the outer radius over their entire length. Arcs 4 and 9 of element K1 touch the inner radius over their entire length. Arcs 4' and 9' of element K2 touch the outer radius over their entire length. Arcs 1' and 12' of element K2 touch the inner radius over their entire length.

FIG. 3*b* shows a pair of transition profiles in which the transition from the two-flight profiles to the one-flight profiles has been completed to an extent of 20%. FIG. 3*c* shows a pair of transition profiles in which the transition has been completed to an extent of 40%. FIG. 3*d* shows a pair of transition profiles in which the transition has been completed to an extent of 60%. FIG. 3*e* shows a pair of transition profiles in which the transition has been completed to an extent of 80%.

The transition takes place in such a manner that in all cases arc 1 of the profile of element K1 touches the dimensionless outer radius RA over its entire length, as a result of which the corresponding arc 1' of the profile of element K2 touches the dimensionless inner radius RI' over its entire length. The transition takes place in such a manner that in all cases arc 4' of element K2 touches the dimensionless outer radius RA', as a result of which the corresponding arc 4 of element K1 touches the dimensionless inner radius RI. It is clear from FIGS. 3*b* to 3*e* that the profiles of K1 and K2 are asymmetrical.

FIG. 3 shows transition profiles in which the dimensionless outer radii RA and RA' are in the range from 0.6146 to 0.6288. The method according to the invention is not limited to this range of the dimensionless outer radius. Using the method according to the invention, profiles with a dimensionless outer radius of between RA greater than 0 and RA smaller than or equal to 1, and preferably in the range from RA=0.52 to RA=0.707, can be generated.

The method according to the invention is explained in the following using the example of the pair of profiles in FIG. 3*d*.

The profiles of elements K1 and are located in one plane. For the sake of simplicity this plane is placed in the xy plane of a Cartesian coordinate system. Also for the sake of simplicity the point of rotation of the profile of element K1 is placed at the origin of the Cartesian coordinate system (x=0, y=0). The dimensionless centre distance A between the two points of rotation of the element K1 and K2 is 1. The point of rotation of the element K2 is placed at coordinate x=A=1, y=0.

In a first step the profile of element K1 is generated, from which the profile of element K2 can be obtained.

The number of arcs n of the profile of element K1 is selected such that n is greater than or equal to 1. In the present example n=16. The dimensionless outer radius RA is selected such that it is greater than 0 and smaller than or equal to the dimensionless centre distance A. In the present example RA=0.6203. The dimensionless inner radius RI is selected such that it is greater than or equal to 0 and smaller than or equal to the dimensionless outer radius RA. In the present example RI=0.3798.

The arcs can be arranged in a clockwise or anticlockwise direction around the axis of rotation. In the present example the arcs are arranged anti-clockwise around the axis of rotation.

Angle $\alpha\_1$ of arc 1 is selected such that it is, in terms of radian measurement, greater than or equal to 0 and smaller than or equal to $2\pi$. In the present example $\alpha\_1=0.2744$. The dimensionless radius $R\_1$ of arc 1 is selected such that it is greater than or equal to 0 and smaller than or equal to the dimensionless centre distance A. In the present example $R\_1=RA=0.6203$. The position of arc 1 is selected such that arc 1 is located within or on the boundary of an annulus having the dimensionless outer radius RA and the dimensionless inner radius RI, whose centre point is located on the point of rotation. The position is preferably predefined by the positions of the starting point and the centre point of arc 1. In the present example the starting point of arc 1 is placed at coordinate x=RA=0.6203, y=0.0000 and the centre point of arc 1 at coordinate $Mx\_1=0.0000$, $My\_1=0.0000$. Thus, arc 1 is located on the outer radius RA and the configuration rule that at least one arc touches the outer radius RA is fulfilled.

Angles $\alpha\_2, \ldots, \alpha\_(n-1)$ of n−2 additional arcs, i.e. 14 additional arcs, are selected according to the invention such that they are, in terms of radian measurement, greater than or equal to 0 and smaller than or equal to $2\pi$. In the present example, the angles of these 14 additional arcs are selected to be $\alpha\_2=0.6330$, $\alpha\_3=0.6330$, $\alpha\_4=0.2208$, $\alpha\_5=0.1864$, $\alpha\_6=0.4003$, $\alpha\_7=0.4003$, $\alpha\_8=0.3934$, $\alpha\_9=0.2744$, $\alpha\_10=0.6330$, $\alpha\_11=0.6330$, $\alpha\_12=0.2208$, $\alpha\_13=0.1864$, $\alpha\_14=0.4143$ and $\alpha\_15=0.4143$. According to the invention, the dimensionless radii $R\_2, \ldots, R\_(n-1)$ of these 14 additional arcs are selected such that they are greater than or equal to 0 and smaller than or equal to the dimensionless centre distance A. In the present example the dimensionless radii of these additional 14 arcs are selected to be $R\_2=0.0000$, $R\_3=1.0000$, $R\_4=0.3797$, $R\_5=0.7485$, $R\_6=0.4726$, $R\_7=0.4726$, $R\_8=0.1977$, $R\_9=0.4827$, $R\_10=0.6000$, $R\_11=0.4000$, $R\_12=0.5173$, $R\_13=0.1485$, $R\_14=0.8887$ and $R\_15=0.8887$.

According to the configuration rules, the arcs are arranged in such a manner that they merge tangentially into each other in such a manner that a closed, convex profile is obtained, wherein an arc whose dimensionless radius is 0 is treated in the same way as an arc whose dimensionless radius is eps, which is a very small positive real number which tends towards 0 (eps<<1, eps→0).

Based on this configuration rule, the end point of an arc is at the same time the starting point of the next arc. The required tangential transition between a first arc and a second subsequent arc is such that the centre point of this second subsequent arc is positioned in such a manner on the straight line through the end point and the centre point of the first arc that the distance between the centre point of the second subsequent arc and the end point of the first arc is equal to the radius of the second subsequent arc and the profile is convex. An arc with a radius of 0 is treated in the same way as an arc with a very small radius eps, which tends towards 0, so that the construction of the tangential transition can be continued. Alternatively an arc with a radius of 0 can be treated in such a manner that the profile has a kink at the position of this arc, the size of the kink being determined by the angle of this arc. In the present example, the abovementioned configuration rule results in the following positions of the centre points of the 14 additional arcs: Mx_2=0.5971, My_2=0.1681, Mx_3=−0.0187, My_3=−0.6198, Mx_4=0.0001, My_4=0.0002, Mx_5=0.0699, My_5=−0.3619, Mx_6=−0.0316, My_6=−0.1054, Mx_7=−0.0316, My_7=−0.1054, Mx_8=−0.2855, My_8=0.0000, Mx_9=−0.0005, My_9=0.0000, Mx_10=0.1124, My_10=0.0318, Mx_11=−0.0107, My_11=−0.1258, Mx_12=−0.0072, My_12=−0.0086, Mx_13=0.0626, My_13=−0.3707, Mx_14=−0.2097, My_14=0.3176 and Mx_15=−0.2097, My_15=0.3176. The end point of arc 4 and the starting point of arc 5 are located on the dimensionless inner radius RI, thus fulfilling the configuration rule that at least one arc touches the dimensionless inner radius RI.

According to the invention, angle α_16 of the last arc is such that the sum of the angles of the 16 arcs is, in terms of radian measurement, 2π, wherein angle α_16 is, in terms of radian measurement, greater than or equal to 0 and smaller than or equal to 2π. In the present example, the angle of the last arc α_16 is 0.3654. According to the invention, the dimensionless radius R_16 of the last arc is such that this last arc closes the profile. Since the end point of arc 15 is at the same time the starting point of the first arc, the radius of arc 16, R_16, is 0.0000. The centre point of arc 16 is thus located at coordinate Mx_16=0.6203, My_16=0.0000.

The configuration rule that all arcs are located within or on the boundary of an annulus with the dimensionless outer radius RA and the dimensionless inner radius RI with the centre point at the point of rotation of the profile is fulfilled by the angles and radii selected in the present example for the 16 arcs and their positions.

The profile of the corresponding element K2 is based on the profile of element K1. According to the invention, the number of arcs n' of the profile of element K2 is the same as the number of arcs n of the profile of element K1. In the present example n' is 16. According to the invention, the dimensionless outer radius RA' is equal to the difference of the dimensionless centre distance A minus the dimensionless inner radius RI of the profile of element K1. In the present example the dimensionless outer radius of RA' is A-RI=0.6202. According to the invention, the dimensionless inner radius RI' is equal to the difference of the dimensionless centre distance A minus the dimensionless outer radius RA. In the present example, the dimensionless inner radius RI' is A-RA=0.3797.

According to the invention, angle α_i' of the i'nth arc of the profile of element K2 is the same as the angle α_i of the inth arc of the profile of element K1, wherein i and i' are integers which together represent all values in the range from 1 to the number of arcs n and n' respectively. In the present example, the angles of the 16 arcs are: α_1'=α_1=0.2744, α_2'=α_2=0.6330, α_3'=α_3=0.6330, α_4'=α_4=0.2208, α_5'=α_5=0.1864, α_6'=α_6=0.4003, α_7'=α_7=0.4003, α_8'=α_8=0.3934, α_9'=α_9=0.2744, α_10'=α_10=0.6330, α_11'=α_11=0.6330, α_12'=α_12=0.2208, α_13'=α_13=0.1864, α_14'=α_14=0.4143, α_15'=α_15=0.4143 and α_16'=α_16=0.3654.

According to the invention, the sum of the dimensionless radius R_i' of the i'nth arc of the profile of element K2 and the dimensionless radius R_i of the inth arc of the profile of element K1 is equal to the dimensionless centre distance A, wherein i and i' are integers which together represent all values in the range from 1 to the number of arcs n and n' respectively (R_1'+R_1=A=1, . . . , R_n'+R_n=A=1). In the present example the radii of the 16 arcs are: R_1'=A-R_1=1-0.6203=0.3797, R_2'=A-R_2=1-0.0000=1.0000, R_3'=A-R_3=1-1.0000=0.0000, R_4'=A-R_4=1-0.3797=0.6203, R_5'=A-R_5=1-0.7485=0.2515, R_6'=A-R_6=1-0.4726=0.5274, R_7'=A-R_7=1-0.4726=0.5274, R_8'=A-R_8=1-0.1977=0.8023, R_9'=A-R_9=1-0.4827=0.5173, R_10'=A-R_10=1-0.6000=0.4000, R_11'=A-R_11=1-0.4000=0.6000, R_12'=A-R_12=1-0.5173=0.4827, R_13'=A-R_13=1-0.1485=0.8515, R_14'=A-R_14=1-0.8887=0.1113, R_15'=A-R_15=1-0.8887=0.1113 and R_16'=A-R_16=1-0.0000=1.0000.

According to the invention, the distance between the centre point of the i'nth arc of the profile of element K2 and the centre point of the inth arc of the profile of element K1 is equal to the dimensionless centre distance A and, according to the invention, the distance between the centre point of the i'nth arc and the point of rotation of element K2 is equal to the distance between the centre point of the inth arc of the profile of element K1 and the point of rotation of element K1 and, according to the invention, the connecting line between the centre point of the i'nth arc and the centre point of the inth arc is a line parallel to a connecting line between the point of rotation of element K2 and the point of rotation of element K1, wherein i and i' are integers which together represent all values in the range from 1 to the number of arcs n and n' respectively (i'=i). By positioning the point of rotation of element K1 at point x=0, y=0 and the point of rotation of element K2 at point x=A=1, y=0, the x coordinate of a centre of the circle Mx_i' can be calculated by adding the dimensionless centre distance A to the x coordinate of the centre of the circle Mx_i, and the y coordinate of the centre of the circle My_i' is the same as the y coordinate of the centre of the circle My_i. In the present example the positions of the centre points of the 16 arcs of the profile of element K2 are: Mx_1'=1.0000, My_1'=0.0000, Mx_2'=1.5971, My_2'=0.1681, Mx_3'=0.9813, My_3'=−0.6198, Mx_4'=1.0001, My_4'=0.0002, Mx_5'=1.0699, My_5'=−0.3619, Mx_6'=0.9684, My_6'=−0.1054, Mx_7'=0.9684, My_7'=−0.1054, Mx_8'=0.7145, My_8'=0.0000, Mx_9'=0.9995, My_9'=0.0000, Mx_10'=1.1124, My_10'=0.0318, Mx_11'=0.9893, My_11'=−0.1258, Mx_12'=0.9928, My_12'=−0.0086, Mx_13'=1.0626, My_13'=−0.3707, Mx_14'=0.7903, My_14'=0.3176, Mx_15'=0.7903, My_15'=0.3176 and Mx_16'=1.6203, My_16'=0.0000.

According to the invention, a starting point of the i'nth arc is located in an opposite direction, in relation to the centre point of the i'nth arc, to that of a starting point of the inth arc in relation to the centre point of the inth arc, wherein i and i' are integers which together represent all values in the range from 1 to the number of arcs n and n' respectively (i'=i). In the present example the starting point of arc 1' of the profile of element K2 is therefore, for example, located at coordinate x=0.6203, y=0.

Using the method according to the invention, all 16 arcs of the profile of element K2 merge tangentially into each other and form a closed, convex profile. Also, all 16 arcs are located within or on the boundary of an annulus with the dimensionless outer radius RA' and the dimensionless inner radius RI', whose centre point is located on the point of rotation of element K2. In addition, arc 1' is located on the dimensionless inner radius RI' and the configuration rule that at least one arc touches the dimensionless inner radius RI' is thereby fulfilled. In addition, the end point of arc 4', which is also the starting point of arc 5', is located on the dimensionless outer radius RA' and the configuration rule that at least one arc touches the dimensionless outer radius RA' is thereby fulfilled.

In the case of symmetrical profiles with a flight number z generated by the according to the invention each of the sections is designed in such a manner that the radii of the arcs of the profile of element K2 are, in reverse order, similarly to the radii of the arcs of the profile of element K1. As will be clear to those skilled in the art, the profile sections of fit over each other exactly on being rotated and mirrored. In the figures hereinbelow, which relate to sections of profiles, frequently no distinction is therefore made between the profile of element K1 and the profile of element K2, reference merely being made to a profile.

Figure 4A:
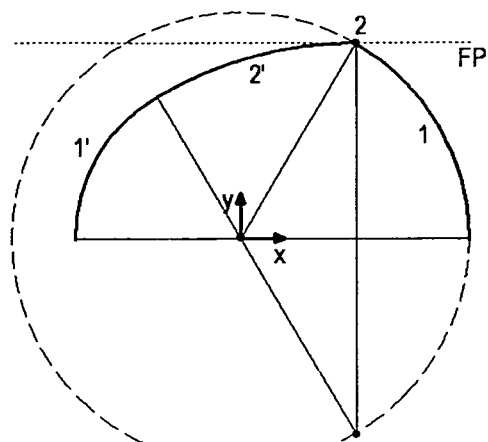
FIGS. 4 a, b depict profiles with one flight obtained by the method according to the invention.
Figure 4B:
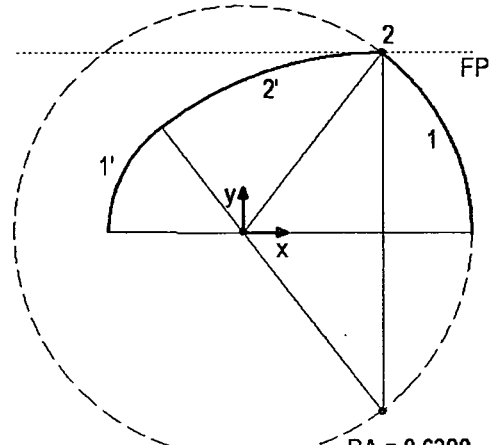

FIGS. 4a and 4b depict profiles with one flight obtained by the method according to the invention. They each depict one half and thus one section of a profile with 1 flight. Most of these figures have the same type of structure, which is described in detail in the following. The xy coordinate system, at whose origin the point of rotation of the profile is located, is in the middle of the figures. The arcs of the profile are shown by thick, unbroken lines which are labelled with the respective arc numbers. The centre points of the arcs are depicted in the form of small circles. The centre points of the arcs are connected by thin, unbroken lines both to the starting point and the end point of the corresponding arc. The straight line FP is depicted by a thin dotted line. The outer screw radius RA is characterized by a thin, broken line and its numerical value is given to four significant digits on the bottom righthand side of each figure. On the righthand side of the figures the radius R, the angle α and the x and y coordinates of the centre point Mx and My of each arc are given to four significant digits. The profile is clearly defined by these values.

FIGS. 4a and 4b depict profiles in which the dimensionless outer radius RA has the values 0.58 and 0.63.

Profiles in which a profile section consists of a total of h arcs are referred to hereinafter as h-circle profiles, i.e. in the case of a profile that in the section consists of for example 2 arcs reference is made to a 2-circle profile.

FIG. 4: FIGS. 4a and 4b depict 4-circle profiles. FIGS. 4a and 4b differ in their outer radius RA. In FIG. 4a the outer radius RA is 0.58. In FIG. 4b the outer radius RA is 0.63. In FIGS. 4a and 4b arc 1 has the radius R_1=RA. In FIGS. 4a and 4b arc 2 has the radius R_2=0. In FIGS. 4a and 4b angle α_1 of arc 1 is dependent on the outer radius RA. In FIGS. 4a and 4b angle α_2 of arc 2 is dependent on the outer radius RA.

FIG. 5: FIGS. 5a to 5d depict 8-circle profiles. In FIGS. 5a to 5d the outer screw radius RA is 0.58. In FIGS. 5a to 5d arc 1 has the radius R_1=0.9061. In FIGS. 5a to 5d arc 2 has the radius R_2=0.1385. In FIGS. 5a to 5d arc 3 has the radius R_3=RA and is located on the outer radius. In FIGS. 5a to 5d radius R_4 of arc 4 is gradually increased. In FIGS. 5a to 5d arc 1 has the angle α_1=0.4304. In FIGS. 5a to 5d arc 2 has the angle α_2=0.3812. In FIGS. 5a to 5d angle α_3 of arc 3 is gradually decreased and angle α_4 of arc 4 is gradually increased.

According to the invention, the profile and thus also the profile section are located in one plane. For the sake of simplicity this plane is placed on the xy plane of a Cartesian coordinate system. Also for the sake of simplicity the point of rotation of the profile is placed at the origin of the Cartesian coordinate system (x=0, y=0).

According to the invention, the flight number z is selected such that z is greater than or equal to 1. In the present example the flight number z is selected to be 1. According to the invention, the n number of arcs of the profile is selected such that n is an integer multiple p of 4*z. In the present example the number of arcs n is selected to be 16, thus giving p=4. According to the invention, the dimensionless outer radius RA is selected such that it is greater than 0 and smaller than or equal to the dimensionless centre distance A. In the present example the dimensionless outer radius RA is selected to be 0.58. According to the invention, the dimensionless inner radius RI is selected such that it is greater than or equal to 0 and smaller than or equal to the dimensionless outer radius RA. In the present example the dimensionless inner radius RI is selected to be A−RA=0.42.

The arcs of the profile can be arranged in a clockwise or anti-clockwise direction about the axis of rotation of the profile. In the present example, the arcs are arranged in an anti-clockwise direction about the axis of rotation.

The profile is subdivided into 2*z sections which are characterized in that each section is bounded by two straight lines which are at an angle to each other of π/z in terms of radian measurement and which meet at the point of rotation of the profile, these two straight lines being referred to as section boundaries. In the present example the profile is subdivided into two sections. For the sake of simplicity, both section boundaries are located on the x axis of the coordinate system. In the present example, only that profile section is explained hereinbelow which is positioned in the positive y direction.

The profile section is subdivided into a first and a second part, the first part consisting of p arcs and the second part consisting of p' arcs, wherein p'=p. In the present example p=p'=4. The arcs of the first part of the profile section can be numbered in ascending or descending order. The arcs of the second part of the section are numbered in reverse order like the arcs of the first part of the section. In the present example the arcs of the first part of the section are numbered in ascending order and the arcs of the second part of the section are numbered in descending order.

According to the invention, angle α_1 of arc 1 of the first part of the section is selected such that it is, in terms of radian measurement, greater than or equal to 0 and smaller than or equal to π/(2*z). In the present example the angle of arc 1 is selected to be α_1=0.4304. According to the invention, the dimensionless radius R_1 of arc 1 of the first part of the section is selected such that it is greater than or equal to 0 and smaller than or equal to the centre distance A. In the present example the dimensionless radius of arc 1 is selected to be R_1=0.9061. According to the invention, the position of arc 1 of the first part of the section is selected such that arc 1 is located within or on the boundary of an annulus with the dimensionless outer radius RA and the dimensionless inner radius RI, whose centre point is located on the point of rotation of the profile. The position is preferably determined by the position of the starting point and the centre point of arc 1. In the method according to the invention the starting point and the centre point of arc 1 are located on one of the section boundaries, the starting point resulting from the position of the centre point and the dimensionless radius R_1. In the present example the centre point of arc 1 is located at coordinate Mx_1=−0.3937, My_1=0.0000 and the starting point is thus located at coordinate x=0.5124, y=0.0000.

According to the invention, the angles α_2, ..., α_(p−1) of p−2 additional arcs, i.e. 2 additional arcs of the first part of the profile section are selected such that they are, in terms of radian measurement, greater than or equal to 0 and smaller than or equal to π/(2*z). In the present example the angles of the 2 additional arcs are selected to be $\alpha\_2=0.3812$ and $\alpha\_3=0.1580$. According to the invention, the dimensionless radii $R\_2, \ldots, R\_(p-1)$ of the 2 additional arcs of the first part of the profile section are selected such that they are greater than or equal to 0 and smaller than or equal to the dimensionless centre distance A. In the present example the dimensionless radii of the 2 additional arcs are selected to be $R\_2=0.1385$ and $R\_3=0.5800$. According to the configuration rules the arcs are arranged so that they merge into each other tangentially in such a manner that a closed, convex profile is obtained, an arc with a dimensionless radius of 0 being treated in the same manner as an arc with a dimensionless radius of eps, which is a very small positive real number which tends towards 0 (eps<<1, eps→0). This configuration rule means that the end point of an arc is at the same time the starting point of the next arc. The required tangential transition between a first arc and a second successive arc is obtained by the centre point of the second successive arc being placed in such a manner on the straight line through the end point and the centre point of the first arc that the distance between the centre point of the second successive arc and the end point of the first arc is equal to the radius of the second successive arc and the profile is convex. An arc with a radius of 0 is treated in the same way as an arc with a very small radius eps, which tends towards 0, so as to allow the tangential transition pattern to be continued. Alternatively, an arc with a radius of 0 can be treated in such a manner that the profile has a kink at the position of this arc, the size of the kink being determined by the angle of this arc. In the present example the abovementioned configuration rule results in the following positions of the centre points of the two additional arcs: $Mx\_2=0.3039$, $My\_2=0.3202$ and $Mx\_3=0.0000$, $My\_3=0.0000$. Arc 3 is positioned on the dimensionless outer radius RA and the configuration rule that at least one arc touches the dimensionless outer radius RA is thereby fulfilled.

According to the invention, angle $\alpha\_4$ of the last arc of the first part of the profile section is such that the sum of the angles of the 4 arcs of the first part of the profile section is, in terms of radian measurement, $\pi/(2*z)$, wherein angle $\alpha\_4$ is, in terms of radian measurement, greater than or equal to 0 and smaller than or equal to $\pi/(2*z)$. In the present example, the angle of this last arc, $\alpha\_4$, is 0.6013. According to the invention, the dimensionless radius $R\_4$ of the last arc of the first part of the profile section is such that the end point of this last arc touches a straight line FP at one point, this straight line FP being vertical on the angle bisector of the two section boundaries of this section and at such a distance from the point of rotation of the profile in the direction of this section which is equal to half the centre distance, the angle bisector like the section boundaries passing through the point of rotation of the profile. In FIG. 5b, straight line FP is shown in the form of a dotted line. Arc 4 of the first part of the profile section is constructed in such a manner that a tangent is placed on arc 3 at the end point of arc 3, the point of intersection between the tangent and the straight line FP being the centre point of a circle whose radius is equal to the length of the distance between the end point of arc 3 and the point of intersection between the tangent and the straight line FP and the point of intersection in the direction of the selected clock direction between the circle and the straight line FP is the required point of contact between the end point of arc 4 and straight line FP. At the end point of arc 4 a perpendicular to the straight line FP is formed. The point of intersection between this perpendicular and the straight line through the end point and the centre point of arc 3 is the centre point of arc 4. In the present example the position of the centre point of arc 4 is $Mx\_4=0.2580$, $My\_4=0.3761$ and the dimensionless radius of arc 4, $R\_4$, is 0.1239.

Angles $\alpha\_p', \ldots, \alpha\_1'$ of the second part of the profile section are formed in such a manner that angle $\alpha\_j'$ of the j'th arc of the second part of the section is the same as angle $\alpha\_j$ of the jth arc of the first part of the section, wherein j and j' are integers which together represent all values in the range from 1 to the number of arcs p and p' respectively ($\alpha\_1'=\alpha\_1, \ldots, \alpha\_p'=\alpha\_p$). In the present example the angles of the second part of the section are $\alpha\_1'=\alpha\_1=0.4304$, $\alpha\_2'=\alpha\_2=0.3812$, $\alpha\_3'=\alpha\_3=0.1580$ and $\alpha\_4'=\alpha\_4=0.6013$.

The dimensionless radii $R\_p', \ldots, R\_1'$ of the second part of the section are determined by the fact that the sum of the dimensionless radius $R\_j'$ of the j'th arc of the second part of a section and the dimensionless radius $R\_j$ of the jth arc of the first part of a section is equal to the dimensionless centre distance A, wherein j and j' are integers which together represent all values in the range from 1 to the number of arcs p and p' respectively ($R\_1'+R\_1=A=1, \ldots, R\_p'+R\_p=A=1$). In the present example the dimensionless radii of the second part of the section are $R\_1'=A-R\_1=0.0939$, $R\_2'=A-R\_2=0.8615$, $R\_3'=A-R\_3=0.4200$ and $R\_4'=A-R\_4=0.8761$.

According to the invention, the position of the arcs of the second part of the section is obtained by the fact that the arcs merge tangentially into each other and the profile is convex. In the present example the following coordinates apply to the centre points of the 4 arcs of the second part of the screw profile section: $Mx\_1'=-0.3937$, $My\_1'=0.0000$, $Mx\_2'=0.3039$, $My\_2'=-0.3202$, $Mx\_3'=0.0000$, $My\_3'=0.0000$ and $Mx\_4'=0.2580$, $My\_4'=-0.3761$. Arc 3 of the second part of the profile section is positioned on the dimensionless inner radius RI and the configuration rule that at least one arc touches the dimensionless inner radius RI is thereby fulfilled.

Figure 6A:
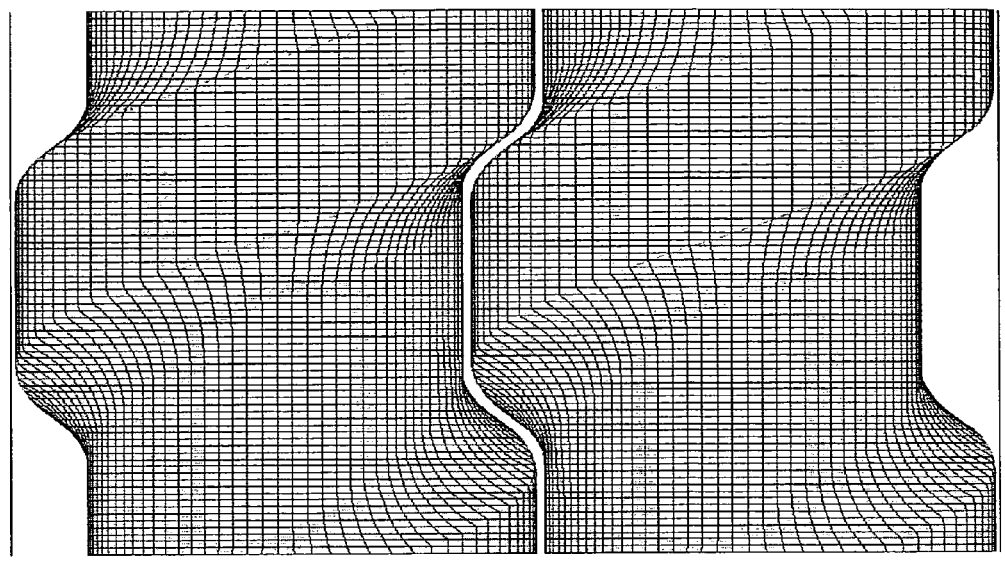
FIGS. 6 a, b depict, by way of example, how the profiles of corresponding elements can be extended in the third dimension.
Figure 6B:
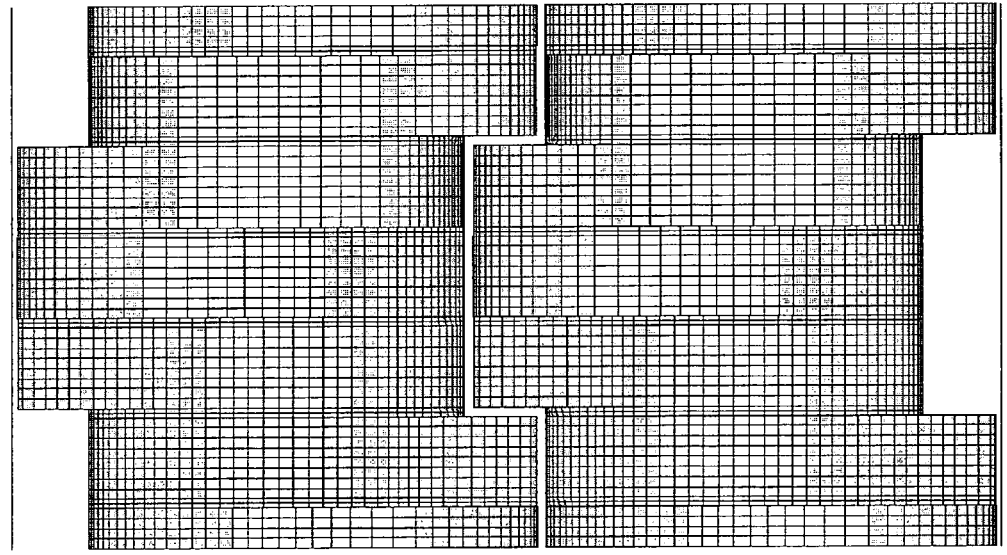

FIGS. 6a and 6b depict, by way of example, how the profiles of corresponding elements can be extended in the third dimension. The elements depicted in FIGS. 6a and 6b are based on the profile of FIG. 4a.

The elements depicted in FIG. 6a can, for example, be used as so-called conveying elements in screw extruders. The barrel radius RG is 0.58. The clearance S between the two conveying elements is 0.02. The clearance D between the two conveying elements and the barrel is 0.01. The pitch T of the conveying elements is 1.2. The length of the conveying elements is 1.2, which corresponds to a rotation of the screw profiles through an angle $2\pi$. The barrel is depicted by thin, unbroken lines on the left and right of the two conveying elements.

The elements depicted in FIG. 6b can be used, for example, as a pair of kneading elements in screw extruders. The barrel radius RG is 0.58. The clearance S between the kneading discs of the two kneading elements is 0.02. The clearance D between the kneading discs of the two kneading elements and the barrel is 0.01. The kneading element consists of 7 kneading discs each staggered in a righthand direction in relation to each other by an angle $\pi/3$. The first and the last kneading disc have a length of 0.09. The kneading discs in the middle have a length of 0.18. The groove between the kneading discs has a length of 0.02. The barrel is depicted by thin unbroken lines on the left and right of the two kneading elements.

FIGS. 7 and 8 depict profiles with 2 flights. FIG. 7 always depicts a quarter of a profile with 2 flights. This figure has the analogous construction to those of FIGS. 4 and 5, which has already been described in detail for these figures.

Figures 7A, 7B:
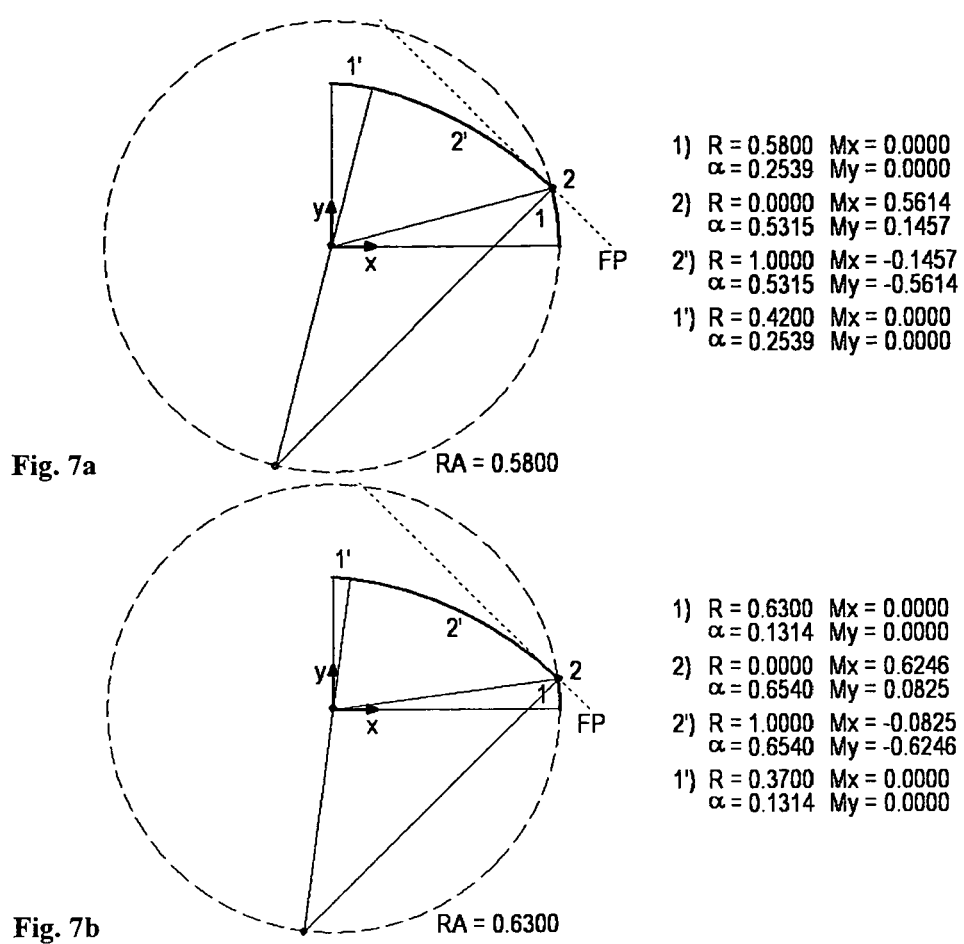
FIGS. 7 a, b depict profiles with 2 flights.

FIG. 7: FIGS. 7a and 7b depict 4-circle profiles. FIGS. 7a and 7b differ by the outer radius RA. In FIG. 7a the outer screw radius RA is 0.58. In FIG. 7b the outer radius RA is 0.63. In FIGS. 7a and 7b arc 1 has the radius R_1=RA. In FIGS. 7a and 7b arc 2 has the radius R_2=0. In FIGS. 7a and 7b angle α_1 of arc 1 is dependent on the outer radius RA. In FIGS. 7a and 7b angle α_2 of arc 2 is dependent on the outer radius RA.

Figure 8A:
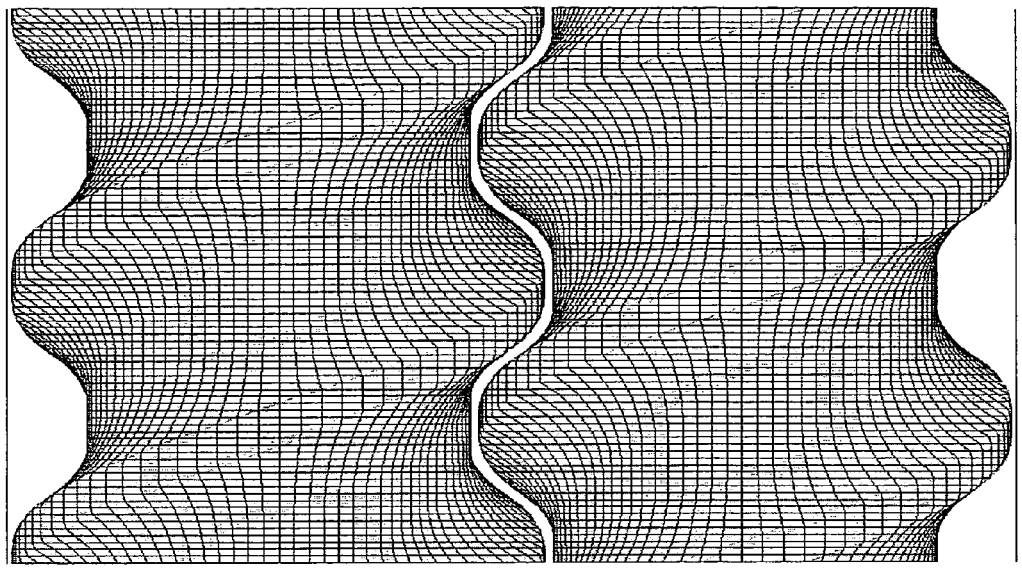
FIGS. 8a, b depict, by way of example, how a profile can be extended in the third dimension in order to obtain corresponding elements.
Figure 8B:
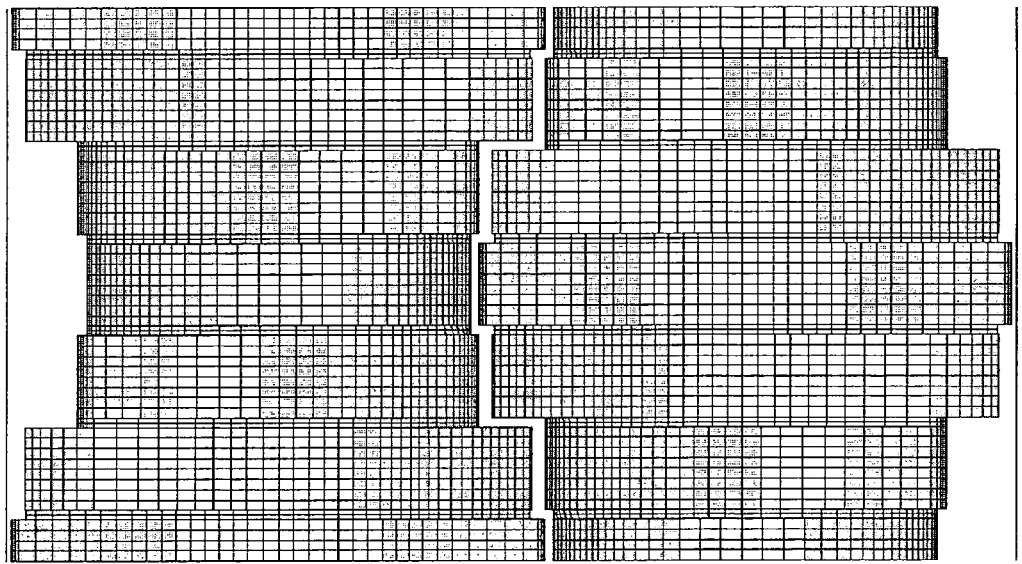

FIGS. 8a and 8b depict, by way of example, how a profile can be extended in the third dimension in order to obtain corresponding elements. The depicted elements are based on the profile of FIG. 7a.

The elements depicted in FIG. 8a can be used, for example, as so-called conveying elements in screw extruders. The barrel radius RG is 0.58. The clearance S between the two conveying elements is 0.02. The clearance D between the two conveying elements and the barrel is 0.01. The pitch T of the conveying elements is 1.2. The length of the conveying elements is 1.2, which corresponds to a rotation of the screw profiles through an angle 2π. The barrel is depicted by thin unbroken lines on the left and the right of the two conveying elements.

The elements depicted in FIG. 8b can be used, for example, as so-called kneading elements in screw extruders. The barrel radius RG is 0.58. The clearance S between the kneading discs of the two kneading elements is 0.02. The clearance D between the kneading discs of the two kneading elements and the barrel is 0.01. The kneading element consists of 7 kneading discs which are each staggered in a righthand direction in relation to each other by an angle π/6. The first and the last kneading disc each have a length of 0.09. The kneading discs in the middle each have a length of 0.18. The groove between the kneading discs has a length of 0.02. The barrel is depicted by thin, unbroken lines on the left and right of the two kneading elements.

The invention claimed is:

1. A method of generating two elements K1 and K2 that co-rotate about two parallel axes that are at a distance a from each other, the method comprising the steps of:
    providing a profile of element K1 having n number of arcs;
    merging the arcs into each other tangentially at their starting and end points such that
    the arcs forming a convex profile,
    wherein a kink in the profile is represented by an arc i with a radius r_i=0 and an angle α_i, and wherein a size of the angle α_i is the same as that of the angle at which the tangents on the arcs on adjacent to arc i intersect each other at the centre point of arc i; and
    forming a profile of element K2 from the profile of element K1 by generating, for each arc of the profile of element K1, a corresponding arc of element K2,
    wherein the two elements K1 and K2 constantly touch each other at at least one point during the co-rotation.

2. The method according to claim 1, wherein
    the angles of corresponding arcs of element K2 are identical in size,
    the sum of the radii of corresponding arcs equals the centre distance a,
    each one of the connecting lines between the centre point of an arc of element K1 and its end points is parallel to each one of the connecting lines between the centre point of the corresponding arc of element K2 and its end points,
    those directions in which the end points of an arc of element K1 lie starting from the centre point of said arc are in each case opposite those directions in which the end points of the corresponding arc of element K2 lie starting from the centre point of said arc of element K2,
    the distance between the centre point of an arc of element K1 and the centre point of a corresponding arc of element K2 equals the centre distance,
    the connecting line between the centre point of an arc of element K1 and the centre point of the corresponding arc of element K2 is parallel to the connecting line between the point of rotation of element K1 and the point of rotation of element K2, and
    the direction in which the centre point of an arc of element K1 would have to be shifted in order to fit exactly over the centre point of the corresponding arc of element K2 is the same as that in which the point of rotation of element K1 must be shifted in order to fit exactly over the point of rotation of element K2.

3. The method according to claim 1, wherein
    a number of arcs n is selected for forming the profile of element K1, wherein n is an integer which is greater than or equal to 1,
    an outer radius ra is selected, wherein ra can be greater than 0 (ra>0) and smaller than or equal to the centre distance (ra≤a),
    an inner radius ri is selected, wherein ri can be greater than or equal to 0 (n≥0) and smaller than or equal to ra (ri≤ra),
    n arcs of element K1 are arranged clockwise or anti-clockwise about the axis of rotation of element K1 in such a manner that the sizes of n−1 arcs are determined by the selectable angles α_1, α_2, ..., α_(n−1) and the selectable radii r_1, r_2, ..., r_(n−1), wherein the angles are, in terms of radian measurement, greater than or equal to 0 and smaller than or equal to 2π and the radii are greater than or equal to 0 and smaller than or equal to the centre distance a;
    the angle α_n of a last arc is determined by the fact that the sum of n angles of the n arcs is, in terms of radian measurement, 2π;
    the radius r_n of a last arc is determined by the fact that this last arc closes the profile;
    all of the arcs merge into each other tangentially to form a convex profile,
    an arc with a radius of 0 is treated preferably in the same way as an arc with a radius of eps, which is a very small positive real number which tends towards 0 (eps<<1, eps→0);
    all of the arcs are located within or on the boundary of an annulus which has an outer radius ra and an inner radius ri and whose centre point is located on the point of rotation of element K1;
    at least one of the arcs is in contact with the outer radius ra; and
    at least one of the arcs is in contact with the inner radius ri.

4. The method according to claim 3, wherein the arcs i' of the profile of element K2 are based on the arcs i of the profile of element K1 such that
    the number of arcs n' is the same as n;
    i and i' are integers which together represent all values in the range from 1 to the number of arcs n and n' respectively (i'=i),
    the following applies to the angles of arcs i': α_1'=α_1; α_2'=α_2; ...; α_n'=α_n;
    the following applies to the radii of arcs i': r_1'=a−r_1; r_2'=a−r_2; ... r_n'=a−r_n; and
    the distance between the centre point of the i'nth arc of the profile of element K2 and the centre point of the inth arc of the profile of element K1 is equal to the centre distance a, the distance between the centre point of the i'nth arc of the profile of element K2 and the point of rotation of element K2 corresponds to the distance between the centre point of the inth arc of the profile of element K1 and the point of rotation of element K1, the connecting line between the centre point of the i'nth arc of the profile of element K2 and the centre point of the inth arc of the profile of element K1 is a line parallel to the connecting line between the point of rotation of element K2 and the point of rotation of element K1, and a starting point of the i'nth arc of the profile of element K2 lies in an opposite direction, in relation to the centre point of the i'nth arc of the profile of element K2, to that in which a starting point of the inth arc of the profile of element K1 lies in relation to the centre point of the inth arc of the profile of element K1.

5. The method according to claim 1, wherein, when using a Cartesian coordinate system with the point of rotation of the profile of element K1 at the origin (x=0, y=0) and the point of rotation of element K2 at the point having the coordinates x=A=1, y=0 and when using dimensionless parameters, the profile of element K1 is formed by the following steps:

a number of arcs n is selected for forming the profile of element K1, wherein n is an integer which is greater than or equal to 1;

an outer radius RA is selected which is greater than 0 (RA>0) and smaller than or equal to the centre distance (RA≤1);

an inner radius RI is selected which is greater than or equal to 0 (RI≥0) and smaller than or equal to RA (RI≤RA); and arcs i of element K1 are arranged clockwise or anticlockwise around the axis of rotation of element K1, wherein i is an index which represents the integers in the range from 1 to n, such that the sum of the angles $\alpha\_i$ of all of the arcs is $2\pi$;

the radius $R\_i$ of each individual arc is greater than or equal to 0 and smaller than or equal to 1;

the starting and centre points of a first arc are placed on the x axis, the starting point being placed in the region between x=RI and x=RA and the x coordinate of the centre point being smaller than or equal to the x coordinate of the starting point;

where i<n, the end point of the inth arc is at the same time the starting point of the (i+1)nth arc;

where i=n, the end point of the inth arc is at the same time the starting point of the first arc;

each arc merges tangentially into the next arc, wherein an arc with $R\_i=0$ is treated in the same way as an arc with $R\_i=eps$, wherein eps is a very small positive real number which tends towards 0 (eps<<1, eps→0);

at no point of the profile is the distance from the point of rotation greater than the outer radius RA;

at at least one point on the profile the distance from the point of rotation is equal to the outer radius RA;

at no point of the profile is the distance from the point of rotation smaller than the inner radius RI;

at at least one point on the profile the distance from the point of rotation is equal to the inner radius RI and the profile is convex.

6. The method according to claim 5, wherein the profile of element K2 is based on the profile of element K1 as follows:
n'=n
i' is an index which represents all numbers from 1 to n'
$\alpha\_i'=\alpha\_i$ where i=i' and
$R\_i'+R\_i=1$ where i=i', the profile consists of n' arcs which are arranged in the same clock direction as the arcs of the profile of element K1, the starting point of the first arc of the profile of element K2 is at the same time the starting point of the first arc of the profile of element K1 and the centre point of the first arc of the profile of element K2 is located on the x axis, the x coordinate of the centre point being greater than or equal to the x coordinate of the starting point, where i'<n' the end point of the i'nth arc is at the same time the starting point of the (i+1)'nth arc, where i'=n' the end point of the i'nth arc is at the same time the starting point of the 1'nth arc, each of the arcs merges tangentially into the next arc, an arc with $R\_i'=0$ being treated as an arc with $R_{13}$ i'=eps, wherein eps is a very small positive real number which tends towards 0 (eps<<1, eps→0), and the profile is convex.

7. The method according to claim 1, wherein the profile of element K1 is formed such that a flight number z is selected, wherein z is an integer which is greater than or equal to 1;

the n number of arcs is selected such that it is an integer multiple p of 4*z;

the profile is subdivided into 2*z sections wherein each section is bounded by two straight lines which form an angle to each other, in terms of radian measurement, of $\pi/z$ and which intersect each other at the point of rotation of the profile, wherein these two straight lines are referred to as section boundaries;

each of these 2*z sections is subdivided into a first and a second part;

the first part of a section is composed of p arcs which are numbered in ascending or descending order;

angles $\alpha\_1, \ldots, \alpha\_p$ of the p arcs are selected so as to give a sum of these angles of $\pi/(2*z)$, wherein the angles are, in terms of radian measurement, greater than or equal to 0 and smaller than or equal to $\pi/(2*z)$;

the second part of a section is composed of p' arcs which are numbered in reverse order to the arcs of the first part of a section, wherein p' is an integer which is the same as p;

angles $\alpha\_p', \ldots, \alpha\_1'$ of the p' arcs are formed in such a manner that the angle $\alpha\_j'$ of the j'th arc of the second part of a section is the same as the angle $\alpha\_j$ of the jth arc of the first part of a section, wherein j and j' are integers which together represent all values in the range from 1 to the number of arcs p and p' respectively ($\alpha\_1'=\alpha\_1, \ldots, \alpha\_p'=\alpha\_p$);

the sum of the radius $r\_j'$ of the j'th arc of the second part of a section and the radius $r\_j$ of the jth arc of the first part of a section is equal to the centre distance a, wherein j and j' are integers which together represent all values in the range from 1 to the number of arcs p and p' respectively ($r\_1'+r\_1=a, \ldots, r\_p'+r\_p=a$);

a centre point and a starting point of the arc with which the profile begins in the first part of a section are positioned on one of the section boundaries of this section, depending on whether the arcs are arranged in a clockwise or an anticlockwise direction; and an end point of the arc with which the profile ends in the first part of a section touches a straight line FP at one point, the straight line FP being vertical on the angle bisector of the two section boundaries of this section and at a distance from the point of rotation of the profile in the direction of this section which is equal to half the centre distance, the angle bisector passing, in the same way as the section boundaries, through the point of rotation of the profile.

8. The method according to claim 7, wherein one section in one of the 2*z sections of the generating screw profile is predefined and the remaining sections of the screw profile are generated by continuous mirroring of the predefined screw profile section at the section boundaries.

9. The method according to claim 8, wherein the case of odd flight numbers the profile of element K2 is identical to the profile of element K1 and in the case of even flight numbers the profile of element K2 is obtained by rotating the profile of element K1 through an angle $\pi/z$.

10. The method according to claim 1, wherein the profiles extend in an axial direction in the shape of a screw, the elements generated in this manner being of left-hand or right-hand direction and having a pitch, standardized on the centre distance, which is in the range from 0.1 to 10 and a length, standardized on the centre distance, which is in the range from 0.1 to 10.

11. The method according to claim 1, wherein the profiles extend stepwise in a linear fashion in an axial direction and the length of the elements, standardized on the centre distance, is in the range from 0.05 to 10.

12. The method according to claim 1, wherein a transitional element is generated by forming a continuous transition from the size(s) and/or position(s) of one or more arcs of a first profile to the size(s) and/or position(s) of one or more arcs of a second profile, and wherein the transitional element is in a right-hand or left-hand direction and has a pitch, standardized on the centre distance, in the range from 0.1 to 10 and an element length, standardized on the centre distance, in the range from 0.1 to 10.

13. A computer program product with program code means stored on a computer-readable data carrier for carrying out the method according to claim 1 upon executing the computer program product on a computer.

* * * * *